United States Patent [19]

Iwakiri et al.

[11] Patent Number: 5,703,146

[45] Date of Patent: Dec. 30, 1997

[54] CURABLE COMPOSITION CONTAINING AN OXYPROPYLENE POLYMER AND CALCIUM CARBONATE WHICH HAS BEEN SURFACE TREATED WITH A FATTY ACID

[75] Inventors: Hiroshi Iwakiri; Masayuki Fujita; Takashi Hasegawa, all of Hyogo, Japan

[73] Assignee: Kanegafuchi Kagaku Kogyo Kabushiki Kaisha, Osaka, Japan

[21] Appl. No.: 655,307

[22] Filed: May 21, 1996

Related U.S. Application Data

[63] Continuation of Ser. No. 942,600, Sep. 10, 1992, abandoned.

[30] Foreign Application Priority Data

Sep. 12, 1991 [JP] Japan .................................. 3-260532

[51] Int. Cl.$^6$ ......................................... C08K 9/00
[52] U.S. Cl. ........................... 523/200; 524/297; 524/425; 524/588; 524/788; 524/860; 524/863; 427/407.1
[58] Field of Search ..................... 523/200; 524/425, 524/588, 297, 863, 788, 860; 427/407.1

[56] References Cited

U.S. PATENT DOCUMENTS

| | | | |
|---|---|---|---|
| 4,618,653 | 10/1986 | Kawakubo et al. | 525/479 |
| 4,983,700 | 1/1991 | Yukimoto et al. | 525/409 |
| 5,013,807 | 5/1991 | Shimizu et al. | 528/17 |

FOREIGN PATENT DOCUMENTS

| | | |
|---|---|---|
| 0 342 411 | 11/1989 | European Pat. Off. . |
| 0 345 800 | 12/1989 | European Pat. Off. . |
| 0 397 036 | 11/1990 | European Pat. Off. . |
| 0 496 109 | 7/1992 | European Pat. Off. . |

OTHER PUBLICATIONS

Patent Abstracts of Japan, vol. 8, No. 260, Nov. 29, 1984, JP-A-59-138259.

Primary Examiner—Karen A. Dean
Attorney, Agent, or Firm—Armstrong, Westerman, Hattori, McLeland & Naughton

[57] ABSTRACT

A curable composition includes (A) 100 parts by weight of an oxypropylene polymer having groups containing silicon atoms bonded to a hydroxy group and/or a hydrolyzable group and capable of crosslinking by forming a siloxane bond, a maximum Mw/Mn of 1.6, and an average molecular weight of at least 6,000, (B) from 100 to 200 parts by weight of calcium carbonate containing at least 30% by weight calcium carbonate of an average particle size of not larger than 0.5 μm and surface-treated with a fatty acid, (C) from 30 to 100 parts by weight of a plasticizer containing at least 5% by weight phthalic acid ester plasticizer, (D) from 0.5 to 10 parts by weight of a compound represented by the formula $R^1Si(OCH_3)_3$ and/or $Si(OCH_2CH_3)_4$ (wherein $R^1$ represents a monovalent organic group containing no amino groups), (E) from 0.5 to 10 parts by weight of a compound represented by following formula (1), and (F) from 0.5 to 5 parts by weight of an organotin curing catalyst, the total amount of components (D) and (E) being at least 2 parts by weight, and component (A) occupying from 15 to 35% by weight;

$$R^2Si(CH_3)_n(OR^3)_{3-n} \qquad (1)$$

wherein $R^2$ represents a monovalent organic group having at least one amino group; $R^3$ represents $CH_3$ or $CH_2CH_3$; and n represents 0 or 1.

6 Claims, No Drawings

CURABLE COMPOSITION CONTAINING AN OXYPROPYLENE POLYMER AND CALCIUM CARBONATE WHICH HAS BEEN SURFACE TREATED WITH A FATTY ACID

This application is a continuation of application Ser. No. 07/942,600 filed Sep. 10, 1992, now abandoned.

FIELD OF THE INVENTION

The present invention relates to a one pack type room temperature-curable composition having a good workability.

Oxypropylene polymers having groups containing a silicon atom to which a hydroxy group and/or a hydrolyzable group is bonded, and capable of crosslinking by forming a siloxane bond (hereinafter referred to as reactive silicon group) are disclosed in JP-A-52-73998 (the term "JP-A" as used herein means an "unexamined published Japanese patent application"), U.S. Pat. No. 3,971,751, etc., and the typical example thereof is a polymer represented by the following general formula:

$$X''_3Si\text{---}(\text{oxypropylene polymer})\text{---}SiX''_3$$

wherein X" represents a hydrolyzable group such as a methoxy group, etc.

The oxypropylene polymer having the reactive silicon group cures by forming a siloxane bond (Si—O—Si) between the polymers by reacting with moisture in the air at room temperature to provide a rubbery cured product. Since the cured product has excellent elongation characteristics, strength, adhesive property, etc., the product has been used as sealants, adhesives, etc.

In the particular case of sealant use, etc., the oxypropylene polymer composition is used as a one-pack type composition which is convenient for handling. The one-pack type composition is a composition prepared by previously compounding all the necessary additives, stored in a closed state and during use cures by the action of moisture in the air.

When the polymer composition is used as a sealant, the composition is kept in a cartridge and is extruded into crevices in the wall, ceiling, floor etc. To facilitate easy filling and extruding of the composition, the viscosity of the polymer (composition) must be low but on the other hand, after application the polymer should not sag before the curing is complete. By reducing the molecular weight distribution of the polymer (corresponding to Mw/Mn; Mw: weight average molecular weight, Mn: number average molecular weight), the viscosity of the polymer is lowered and the extrusion property is improved compared to polymers with a large molecular weight distribution. However, as the viscosity of the polymer is reduced the potential for sagging to occur is increased.

In particular, in the one-pack type of composition containing a plasticizer, dehydrating agent, adhesion improver, and curing catalyst, the additives frequently lower the viscosity of the composition, since they are low-molecular weight compounds, and hence the problem of sagging becomes particularly severe.

SUMMARY OF THE INVENTION

It was discovered that in a one-pack type composition using an oxypropylene polymer having the reactive silicon group and a narrow molecular weight distribution, adding thereto calcium carbonate of an average particle size not larger than 0.2 μm and surface-treated with a fatty acid, the occurrence of sagging of the composition can be prevented with maintaining good extrusion properties.

According to the present invention, there is provided a curable composition comprising (A) 100 parts by weight of an oxypropylene polymer having groups containing a silicon atom to which a hydroxy group and/or a hydrolyzable group is bonded, Mw/Mn of not more than 1.6, and an average molecular weight of at least 6,000, (B) from 100 to 200 parts by weight of calcium carbonate containing at least 30% by weight calcium carbonate of an average particle size of not larger than 0.5 μm, and surface-treated with a fatty acid, (C) from 30 to 100 parts by weight of a plasticizer containing at least 5% by weight a phthalic acid ester series plasticizer, (D) from 0.5 to 10 parts by weight of a compound represented by the formula $R^1Si(OCH_3)_3$ and/or $Si(OCH_2CH_3)_4$ (wherein $R^1$ represents a monovalent organic group having no amino group), (E) from 0.5 to 10 parts by weight of a compound represented by following formula (1), and (F) from 0.5 to 5 parts by weight of an organotin curing catalyst, the total amount of said components (D) and (E) being at least 2 parts by weight and said component (A) occupying from 15 to 35% by weight.

$$R^2Si(CH_3)_n(OR^3)_{3-n} \quad (1)$$

wherein $R^2$ represents a monovalent organic group having at least one amino group; $R^3$ represents $CH_3$ or $CH_2CH_3$; and n represents 0 or 1.

DETAILED DESCRIPTION OF THE INVENTION

In the oxypropylene polymer as component (A), the groups containing a silicon atom to which a hydroxy group and/or a hydrolyzable group is bonded and capable of cross-linking by forming a siloxane bond (reactive silicon group) is preferably a group represented by following formula (2):

$$-\left(\begin{array}{c} R_{2-b}^4 \\ | \\ Si-O \\ | \\ X_b \end{array}\right)_m \begin{array}{c} R_{3-m}^5 \\ | \\ Si-X_a \\ | \\ \end{array} \quad (2)$$

wherein $R^4$ and $R^5$ each represents an alkyl group having from 1 to 20 carbon atoms, an aryl group having from 6 to 20 carbon atoms, an aralkyl group having from 7 to 20 carbon atoms, or a triorganosiloxy group shown by (R')$_3$SiO— (wherein R' represents a monovalent hydrocarbon group having from 1 to 20 carbon atoms and said three R's may be the same or different), when two or more $R^4$s and $R^5$s exist, they may be the same or different; X represents a hydroxyl group or a hydrolyzable group, and when two or more Xs exist, they may be the same or different; a represents 0 or an integer from 1 to 3; b represents 0 or an integer 1 or 2; and bs in m groups of

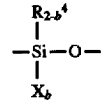

$$\begin{array}{c} R_{2-b}^4 \\ | \\ -Si-O- \\ | \\ X_b \end{array}$$

may be the same or different; and m represents 0 or an integer from 1 to 19, said a and b satisfying a+Σb≧1.

Practical examples of the hydrolyzable group are a hydrogen atom, a halogen atom, an alkoxy group, an acyloxy group, a ketoxymate group, an amino group, an acid amide group, an aminoxy group, a mercapto group, and an alkenyloxy group. Of these groups, a hydrogen atom, an alkoxy group, an acyloxy group, a ketoxymate group, an amino group, an amide group, an aminoxy group, a mercapto group, and an alkenyloxy group are preferred. An alkoxy group such as methoxy is particularly preferable due to mild hydrolysis and easy handling of the compound.

One to three hydrolyzable groups or hydroxy groups can bond to one silicon atom and a value of 1 to 5 for (a+Σb) is preferably. When two or more hydrolyzable groups or hydroxy groups exist, they may be the same or different.

The reactive silicon group, may contain one or more silicon atoms and when the silicon atoms of the reactive silicon group participate in siloxane bonds, etc., about 20 silicon atoms may exist.

In addition, the reactive silicon groups shown by the following formula are preferable from the point of economy.

wherein m=0 and $R^5$, X, and a are same as described above

Practical examples of $R^4$ and $R^5$ in formula (2) are an alkyl group such as methyl, ethyl, etc., a cycloalkyl group such as cyclohexyl, etc., an aryl group such as phenyl, etc., an aralkyl group such as benzyl, etc., and the triorganosiloxy group shown by $(R')_3SiO-$ wherein R' is methyl or phenyl.

For $R^4$, and $R^5$, and R' methyl group is particularly preferable.

It is preferable that at least one, and preferably from 1.1 to 5 reactive groups exist in one molecule of the oxypropylene polymer. If the number of reactive silicon groups existing in one molecule is less than one, the curability of the curable composition becomes insufficient to produce good rubbery elastic polymer.

The reactive silicon groups may exist at the terminal of the molecular chain of the oxypropylene polymer or may exist in the molecular chain of the polymer. When the reactive silicon group exists at the terminal of the molecular chain, a rubbery cured product having a high strength, a high elongation, and a low elasticity is obtained.

The molecular weight distribution (Mw/Mn) of the oxypropylene polymer as component (A) is 1.6 or lower. Also, when Mw/Mn is 1.4 or lower and further 1.3 or lower, the properties of the composition of the present invention improve considerably.

The molecular weight of the oxypropylene polymer (A) is not lower than 6,000, preferably not lower than 10,000, and more preferably not lower than 15,000.

The parameter (Mw/Mn) can be measured by gel permeation chromatography.

The methods for preparing the oxypropylene polymer (A) is described in JP-A-3-72527, etc.

Examples of component (B) of the curable composition of the present invention include colloidal calcium carbonate, light-weight calcium carbonate, heavy-weight calcium carbonate, and calcium carbonate surface-treated with various surface-treating agents. These calcium carbonate can be used alone or as a mixture thereof. In the present invention, calcium carbonate having an average particle size of not larger than 0.5 μm, and surface-treated with a fatty acid should be used in an amount of at least 30% by weight of whole calcium carbonate. A calcium carbonate having an average particle size of not larger than 0.2 μm, and is surface-treated with a higher fatty acid is more preferable.

As the plasticizer, component (C) of the curable composition of this invention, phthalic acid esters are used. In addition to the component (c) other plasticizers such as aliphatic dibasic acid esters, aliphatic esters, phosphoric acid esters, epoxy plasticizers, polyester, polyether, polystyrene, polybutadiene, a butadiene-acrylonitrile copolymer, polychloroprene, polyisoprene, polybutene, chlorinated paraffins, etc., can be optionally used. In the present invention, it is necessary to use the plasticizer(s) in the range from 30 to 100 parts by weight, and preferably from 50 to 80 parts by weight from the view point of workability such as extruding processability.

If the content of plasticizer is less than 30 parts by weight, the viscosity of the curable composition becomes too high and the product becomes difficult to handle in procedure such as extrusion, etc. On the other hand, if the content of the plasticizer is over 100 parts by weight, the viscosity of the curable composition becomes too low, whereby the problem in workability such as sagging, etc., occurs.

In the present invention, it is necessary to use the phthalic acid ester plasticizer in an amount of at least 5% by weight based on the total amount of used plasticizer, whereby paintability to the sealant surface (the adhesive property of a paint to the surface of the sealant) can be attained. As the phthalic acid ester series plasticizer, dioctyl phthalate and di(2-ethylhexyl phthalate) are preferred.

For insuring storage stability of the curable composition of the present invention, components (D) and (E) which are dehydrating agents are used.

Practical examples of component (D) include $Si(OC_2H_5)_4$, $CH_2=CHSi-(OCH_3)_3$, $HSCH_2CH_2CH_2Si(OCH_3)_3$, and the hydrolyzable silicon compounds illustrated;

Compound (1)

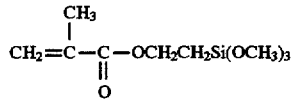

Compound (2)

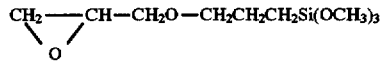

Compound (3)

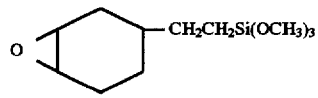

Practical examples of component (E) include amino-substituted alkoxysilanes such as $H_2NCH_2CH_2NHCH_2CH_2CH_2-Si(OCH_3)_3$, $H_2NCH_2CH_2NHCH_2CH_2CH_2Si(CH_3)(OCH_3)_2$, $(C_2H_5O)_3Si-CH_2CH_2CH_2NHCH_2CH_2NHCH_2CH_2CH_2Si(OC_2H_5)_3$, etc., and aminosilane compounds such as the reaction products of the above-described amino-substituted alkoxysilanes and epoxysilane compounds such as Compounds (2) and (3) described above or the reaction products of the foregoing amino-substituted alkoxysilane and methacryloxysilane compounds such as $CH_2=C(CH_3)C(O)OCH_2CH_2CH_2Si(OCH_3)_3$, $CH_2=C(CH_3)C(O)OCH_2CH_2-CH_2Si(OCH_2CH_2OCH_3)_3$, etc., and they can be used alone or as a combination thereof.

From the view points of economical reason $CH_2=CHSi(OCH_3)_3$ and $CH_3CH_2Si(OCH_3)_3$ as component (D) are preferably used.

The amount of the dehydrating agent used depends upon the moisture content in the curable composition but the dehydrating agent usually ranges from 0.5 to 10 parts by weight, and preferably from 1 to 5 parts by weight. If the amount of the dehydrating agent is less than 0.5 part by weight, a problem occurs in the storage stability when more than 10 parts by weight of the dehydrating agent is used, the modulus of the cured product increases.

To insure the adhesive properties of the curable composition (in particular, the adhesion to conventional surfaces without primer), the addition of component (E) is necessary and from an economical view point $H_2N(CH_2)_2NH—(CH_2)_3Si(OCH_3)_3$ is preferred. The amount of component (E) is used from 0.5 to 10 parts by weight, and preferably from 1 to 5 parts by weight. If the amount is less than 0.5 part by weight, the adhesive properties are insufficient, while if the amount is over 10 parts by weight, the cost is too high and performance suffers due to increasing the modulus and lowering the water resistance.

The organotin curing catalyst (F) is necessary for rapid curing.

Practical examples of the organotin curing catalyst includes tin carboxylates such as dibutyltin dilaurate, dibutyltin maleate, dibutyltin diacetate, tin octylate, tin naphthenate, etc.; the reaction product of dibutyltin oxide and a phthalic acid ester; and dibutyltin diacetylacetonate. However, dibutyltin dilaurate, the reaction product of dibutyltin oxide and dioctyl phthalate (DOP), and dibutyltin diacetylacetonate are preferable for rapid curing. The use of an amine compound together with these tin compounds also expedites curing.

Practical examples of the amine compound that can be used are diethylenetriamine, triethylenetetramine, tetraethylenepentamine, butylamine, hexylamine, octylamine, decylamine, laurylamine, hexamethylenediamine, triethanolamine, dibutylamine, diethanolamine, N,N,N',N'-tetramethyl-1,3-butanediamine, benzylamine, cyclohexylamine, dodecamethylenediamine, dimethylethylenediamine, dimethylaminoethanol, N,N,N',N'-tetramethylethylenediamine, triethylamine, N,N-dimethylaniline, and dimethylbenzylamine. The use of laurylamine is preferable because of reactivity and handling properties.

In this invention, it is important to attain all desired characteristics to use from 15 to 35% by weight of component (A) in the curable composition. If the content of component (A) is less than 15% by weight, problems occur in the adhesive properties and with workability, while if the content is more than 35% by weight, the control of the workability becomes undesirably difficult.

The curable composition of the present invention may contain a thixotropy-providing agent, an ultraviolet absorbent, an antioxidant, a light stabilizer, a pigment and other additives. Furthermore, if necessary, the curable composition may contain various additives such as additional curing catalyst (e.g., titanic acid esters and lead octylate), adhesion-improving agent, property controlling agent, storage stability improving agent, metal inactivating agent, ozone-deterioration inhibitor, amine radical chain inhibitor, phosphorus peroxide decomposing agent, lubricant, foaming agent or other additives.

The following examples are intended to illustrate the present invention more precisely. Unless otherwise indicated, all parts, percentages and ratios are by weight.

EXAMPLES 1 TO 3

Using a polyoxypropylene having groups $(CH_3O)_2Si(CH_3)CH_2CH_2CH_2—$ at 85% of the whole terminals, a number average molecular weight (measured by gel permeation chromatography using polystyrene as standard polymer) of 12,000, and a molecular weight distribution (Mw/Mn) of 1.25 (polymer A), curable compositions shown in Table 1 was prepared and the characteristics of these compositions were evaluated. The results are shown in Table 1. In Table 1, PPG represents polypropylene glycol having a molecular weight of about 2,500; Nocrack NS-6® represents a bisphenol type hindered phenol antioxidant agent, TINUVIN® 327 represents a benzotriazole UV absorbent produced by Ciba-Geigy Ltd., Sanol® LS-770 represents a hindered amine stabilizer produced by Sankyo Co., Ltd.

Each curable composition in the examples was prepared by placing whole components, except tin catalyst and silicon compounds, into a 5 liter Planetary mixer, dehydrating for 5 hours at 110° C. under reduced pressure, and cooling the mixture to room temperature. After introducing the silicon compounds and the tin catalyst to the mixture, and stirring the resultant mixture for 30 minutes, the mixture was packed into a cartridge.

Characteristics of the compounds were evaluated as follows.

Sagging Property:

The property was evaluated by applying each curable composition into a vertical wall gap and observing the degree of sagging.

A: No sagging

B: Little sagging

C: Substantially sagging.

Extruding Properties:

The extruding properties were evaluated by filling a cylindrical cartridge with each curable composition and determining whether the composition was extruded easily.

A: Easily extruded

B: Extruded with considerable pressure.

Coating Property:

A commercially available acrylic paint was painted over a 5×5 squire cut pattern of each cured product. The coating property was evaluated by the number of peeled squares of coating.

A: 0/25

B: less than 5/25

C: 6–20/25

D: more than 20/25

Storage Stability:

The storage stability was evaluated by determining the increasing ratio of the viscosity of each curable composition after storing it for one month at 50° C.

A: Increasing ratio of less than 1.5 times.

B: Increasing ratio of more than 1.5 times.

Adhesive Property:

The property was evaluated by applying each curable composition into the gap between two sheets of glass, allowing the composition to cure, and breaking the glass plates to determine the state of adhesion of the cured composition on the glass plate.

A: Cohesive failure

B: Adhesive failure.

COMPARATIVE EXAMPLES 1 TO 5

Using polyoxypropylene having groups $(CH_3O)_2Si—(CH_3)_2CH_2CH_2CH_2—$ at 85% of the whole terminals, a number average molecular weight (measured by gel permeation chromatography using polystyrene as a standard polymer) of 12,000, and a molecular weight distribution (Mw/Mn) of 2.0 (polymer C) and polymer A curing compositions shown in Table 1 was prepared and the characteristics of each composition were evaluated as in the above-described examples. The results obtained are shown in Table 1.

molecular weight distribution, little sagging occurs. (comparative Example 5)

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Compounding agent |  |  |  |  |  |  |  |  |
| Polymer | A 100 | A 100 | A 100 | C 100 | C 100 | C 100 | A 100 | C 100 |
| Colloidal Calcium Carbonate (particle size: 0.08 μm) treated with Fatty Acid | 100 | 150 | 150 | 100 | 150 | 150 | 30 | 30 |
| Heavy Calcium Carbonate (particle size 2 μm) | 30 | 50 | 50 | 30 | 50 | 50 | 100 | 100 |
| Plasticizer Dioctyl phthalate | 50 | 10 | 10 | 50 | 10 | 10 | 50 | 50 |
| Plasticizer PPG | — | 70 | 70 | — | 70 | 70 | — | — |
| $CH_2=CHSi(OCH_3)_3$ | 3 | 3 | 3 | 3 | 3 | 3 | 3 | 3 |
| $H_2N(CH_2)_2NH(CH_2)_3Si(OCH_3)_3$ | 2 | 2 | 2 | 2 | 2 | 2 | 2 | 2 |
| Organotin Curing Catalyst Dibutyltin Diacetyl Acetonate | 2 | 2 | No. 918 2 | 2 | 2 | No. 918 2 | 2 | 2 |
| Thixotropy Imparting Agent Amide Series Wax | 3 | 3 | 3 | 3 | 3 | 3 | 3 | 3 |
| Filler Rutile Type Titanium Oxide | 20 | 20 | 20 | 20 | 20 | 20 | 20 | 20 |
| Antioxidant Nocrack NS-6 | 1 | 1 | 1 | 1 | 1 | 1 | 1 | 1 |
| Ultraviolet Absorbent TINUVIN ® 327 | 1 | 1 | 1 | 1 | 1 | 1 | 1 | 1 |
| Stabilizer Sanol ® LS-770 | 1 | 1 | 1 | 1 | 1 | 1 | 1 | 1 |
| Characteristics |  |  |  |  |  |  |  |  |
| Sagging Property | A | A | A | A | A | A | C | B |
| Extruding Property | A | A | A | B | B | B | A | A |
| Coating Property | A | A | A | A | A | A | A | A |
| Storage Stability | A | A | A | A | A | A | A | A |
| Adhesive Property | A | A | A | A | A | A | A | A |

Note:
No. 918 represents the reaction product of dibutyltin oxide and dioctyl phthalate produced by Sankyo Yuki Ltd., and dibutyltin diacetyl acetonate was not used.

As is clear from the results shown in Table 1, that when the polymers have a small molecular weight distributions as in Examples 1 to 3, curable compositions demonstrate good extruding property and decreased sagging property compared with the polymers having a large molecular weight distributions.

Also, from Comparative Example 4, it can be seen that when the polymer has a small molecular weight distribution, and a reduced amount of calcium carbonate treated with a fatty acid is used, sagging of each curable composition becomes severe. However, if the polymer has a large

EXAMPLES 4 TO 6 AND COMPARATIVE EXAMPLES 6 TO 8

Using polymer B which is polyoxypropylene having groups $(CH_3O)_2Si(CH_3)CH_2CH_2CH_2NHC(O)O$— at 90% of the whole terminals, a number average molecular weight of 20,000, and a molecular weight distribution (Mw/Mn) of 1.3, polymers A and C, curable compositions shown in Table 2 was prepared and the characteristics of the compositions were evaluated as described above. The results are shown in Table 2.

TABLE 2

|  | Example 4 | Example 5 | Example 6 | Comparative Example 6 | Comparative Example 7 | Comparative Example 8 |
|---|---|---|---|---|---|---|
| Compounding agent |  |  |  |  |  |  |
| Polymer | A 100 | B 100 | A 100 | A 100 | A 100 | A 100 |
| Colloidal Calcium Carbonate (particle size: 0.08 μm) treated with Fatty Acid | 150 | 150 | 150 | 150 | 150 | 150 |

TABLE 2-continued

|  | Example 4 | Example 5 | Example 6 | Comparative Example 6 | Comparative Example 7 | Comparative Example 8 |
|---|---|---|---|---|---|---|
| Heavy Calcium Carbonate (particle size 2 μm) | 30 | 30 | 30 | 30 | 30 | 30 |
| Plasticizer Dioctyl phthalate | 10 | 10 | BBP* 10 | 0 | 10 | 10 |
| Plasticizer PPG | 70 | 70 | 70 | 70 | 70 | 70 |
| $CH_2$=CHSi$(OCH_3)_3$ | 3 | 2 | 2 | 3 | 0 | 3 |
| $H_2N(CH_2)_2NH(CH_2)_3Si(OCH_3)_3$ | 2 | 3 | 3 | 2 | 1 | 0 |
| Organotin Curing Catalyst Dibutyltin Diacetyl Acetonate | 2 | 2 | 2 | 2 | 2 | 2 |
| Thixotropy Imparting Agent Amide Series Wax | 3 | 3 | 3 | 3 | 3 | 3 |
| Filler Rutile Type Titanium Oxide | 20 | 20 | 20 | 20 | 20 | 20 |
| Antioxidant Nocrack NS-6 | 1 | 1 | 1 | 1 | 1 | 1 |
| Ultraviolet Absorbent TINUVIN ® 327 | 1 | 1 | 1 | 1 | 1 | 1 |
| Stabilizer Sanol ® LS-770 | 1 | 1 | 1 | 1 | 1 | 1 |
| Characteristics |  |  |  |  |  |  |
| Sagging Property | A | A | A | A | A | A |
| Extruding Property | A | A | A | A | A | A |
| Coating Property | A | A | A | C | A | A |
| Storage Stability | A | A | A | A | B | A |
| Adhesive Property | A | A | A | A | B | B |

(*): BBP represents butyl benzyl phthalate and dioctyl phthalate was not used.

As shown in Table 2, in Comparative Examples 6 and 7, without the phthalic acid ester plasticizer, the coating property of the cured product is reduced and when $CH_2$=CHSi—$(OCH_3)_3$, component (D), is not included, the storage stability of the curable composition is reduced.

Furthermore, from Comparative Example 8, without $H_2N(CH_2)_2NH(CH_2)_3Si(OCH_3)_3$, the adhesion properties of the curable composition are reduced.

While the invention has been described in detail and with reference to specific embodiments thereof, it will be apparent to one skilled in the art that various changes and modifications can be made therein without departing from the spirit and scope thereof.

What is claimed is:

1. A curable composition comprising:
   (A) 100 parts by weight of an oxypropylene polymer having groups containing a silicon atom to which a hydroxy group or a hydrolyzable group or both a hydroxy group or a hydrolyzable group is bonded, Mn/Mw of not more than 1.6, and an average molecular weight of at least 6,000,
   (B) from 100 to 200 parts by weight of calcium carbonate of an average particle size of not larger than 0.5 μm, and surface-treated with a fatty acid,
   (C) from 30 to 100 parts by weight of a plasticizer containing at least 5% by weight phthalic acid ester plasticizer,
   (D) from 0.5 to 10 parts by weight of a compound represented by the formula $R^1Si(OCH_3)_3$ or $Si(OCH_2CH_3)_4$ wherein $R^1$ represents a monovalent organic group containing no amino group,
   (E) from 0.5 to 10 parts by weight of a compound represented by the following formula (1), $$R^2Si(CH_3)_n(OR^3)_{3-n} \tag{1}$$

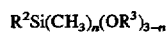

wherein $R^2$ represents a monovalent organic group having at least one amino group, $R^3$ represents $CH_3$ or $CH_2CH_3$, and n represents 0 or 1, and (F) from 0.5 to 5 parts by weight of an organotin curing catalyst,
   the total amount of said components (D) and (E) being at least 2 parts by weight, and said component (A) occupying from 15 to 35% by weight.

2. The curable composition of claim 1, wherein in component (A) the groups containing a silicon atom to which a hydroxy group and/or a hydrolyzable group is bonded and capable of crosslinking by forming a siloxane bond comprise a group represented by following formula (2);

wherein $R^4$ and $R^5$ each represents an alkyl group having from 1 to 20 carbon atoms, an aryl group having from 6 to 20 carbon atoms, an aralkyl group having from 7 to 20 carbon atoms, or a triorganosiloxy group represented by the formula $(R')_3SiO$— wherein R' represents a monovalent hydrocarbon group having from 1 to 20 carbon atoms and three R's may be the same or different, when two or more $R^4$ and $R^5$ exist, they may be the same or different; X represents a hydroxy group or a hydrolyzable group, when two or more Xs exist, they may be the same or different; a represents 0 or an integer of from 1 to 3; b represents 0 or an integer of from 1 to 2; and when two or more

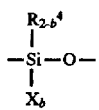

exist bs in

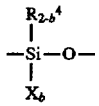

may be the same or different; m represents 0 or an integer of from 1 to 19, said a and b satisfying a+Σb≧1.

3. The curable composition of claim 1, wherein in component (A), the groups containing silicon atoms to which a hydroxy group and/or a hydrolyzable group is bonded and capable of crosslinking by forming a siloxane bond are represented by the formula;

wherein $R^5$, X, and a are same as described above.

4. The curable composition of claim 1, wherein the molecular weight of the oxypropylene polymer of component (A) is at least 10,000 and Mw/Mn thereof is not more than 1.5.

5. The curable composition of claim 1, wherein the phthalic acid ester plasticizer is di(2-ethylhexyl phthalate).

6. The composition of claim 1 wherein said composition is a one-pack and is contained in a cartridge case.

* * * * *